US008662758B2

(12) United States Patent
Huang

(10) Patent No.: US 8,662,758 B2
(45) Date of Patent: Mar. 4, 2014

(54) OPTICAL FIBER COUPLING DEVICE

(75) Inventor: Yung-Lun Huang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 46 days.

(21) Appl. No.: 13/526,544

(22) Filed: Jun. 19, 2012

(65) Prior Publication Data
US 2013/0163929 A1 Jun. 27, 2013

(30) Foreign Application Priority Data

Dec. 27, 2011 (TW) .............................. 100148898 A

(51) Int. Cl.
G02B 6/38 (2006.01)
(52) U.S. Cl.
USPC ................................. 385/56; 385/52; 385/74
(58) Field of Classification Search
USPC .......................................... 385/52, 56, 58, 74
See application file for complete search history.

(56) References Cited

U.S. PATENT DOCUMENTS

| 4,835,078 | A  | * | 5/1989 | Harvey | 430/22 |
| 5,241,612 | A  | * | 8/1993 | Iwama | 385/74 |
| 5,699,463 | A  | * | 12/1997 | Yang et al. | 385/22 |
| 6,181,856 | B1 | * | 1/2001 | Brun | 385/52 |
| 6,798,933 | B2 | * | 9/2004 | Steinberg | 385/16 |
| 7,290,321 | B2 | * | 11/2007 | Steinberg et al. | 29/464 |
| 7,985,026 | B1 | * | 7/2011 | Lin et al. | 385/71 |
| 8,355,612 | B2 | * | 1/2013 | Kang et al. | 385/52 |

* cited by examiner

Primary Examiner — Daniel Petkovsek
(74) Attorney, Agent, or Firm — Altis Law Group, Inc.

(57) ABSTRACT

An optical fiber coupling device includes a first optical fiber connector having a light source; and a second optical fiber connector matched with the first optical fiber connector by pull and plug. The second optical fiber connector includes a light sensor. The light sensor records a predetermined light level as a reference when the second optical fiber connector is at a aligned position to the first optical fiber connector, and is capable of detecting an incident light level, thereby showing that whether the second optical fiber connector is at the aligned position to the first optical fiber connector by compare of the incident light level and the reference.

18 Claims, 4 Drawing Sheets

OPTICAL FIBER COUPLING DEVICE

BACKGROUND

1. Technical Field

The present disclosure relates to optical fiber coupling devices, and particularly to an optical fiber coupling device including a first optical fiber connector and a second optical fiber connector matched with the first optical fiber connector.

2. Description of Related Art

In order to obtain a higher transmission speed, optical fiber coupling devices are used instead of electrical connectors. Referring to FIG. 4, a typical optical fiber coupling device 10 includes a first optical fiber connector 11 and a second optical fiber connector 13. One of the first optical fiber connector 11 and the second optical fiber connector 13 may be buried in an electronic device, and the other one is used as a plug. Each of the first optical fiber connector 11 and the second optical fiber connector 13 has one or more optical fiber holes 113, 133 for receiving the corresponding optical fibers, with each optical fiber hole 113, 133 corresponding to a lens 12, 14 integrally formed with the first optical fiber connector 11 or the second optical fiber connector 13. Such lenses 12, 14 are used for concentrating light to the corresponding optical fibers.

Protrusions 101 and hole portions 131 are usually used in the respective first optical fiber connector 11 and the second optical fiber connector 13 for alignment. However, as the protrusions 101 and the hole portions 131 themselves may be not in alignment in forming the first optical fiber connector 11 and the second optical fiber connector 13, and as well as the lenses 12, 14. Furthermore, after repeatedly pulling and plugging, the protrusions 101 may become abrasive, then the alignment of the first optical fiber connector 11 and the second optical fiber connector 13 may be not satisfactory.

What is needed, therefore, is an optical fiber coupling device, which can overcome the above shortcomings.

BRIEF DESCRIPTION OF THE DRAWINGS

Many aspects of the present optical fiber coupling device can be better understood with reference to the following drawings. The components in the drawings are not necessarily drawn to scale, the emphasis instead being placed upon clearly illustrating the principles of the present optical fiber coupling device. Moreover, in the drawings, like reference numerals designate corresponding parts throughout the several views.

DETAILED DESCRIPTION

Embodiments of the present optical fiber coupling device will now be described in detail below and with reference to the drawings.

Figure 1:
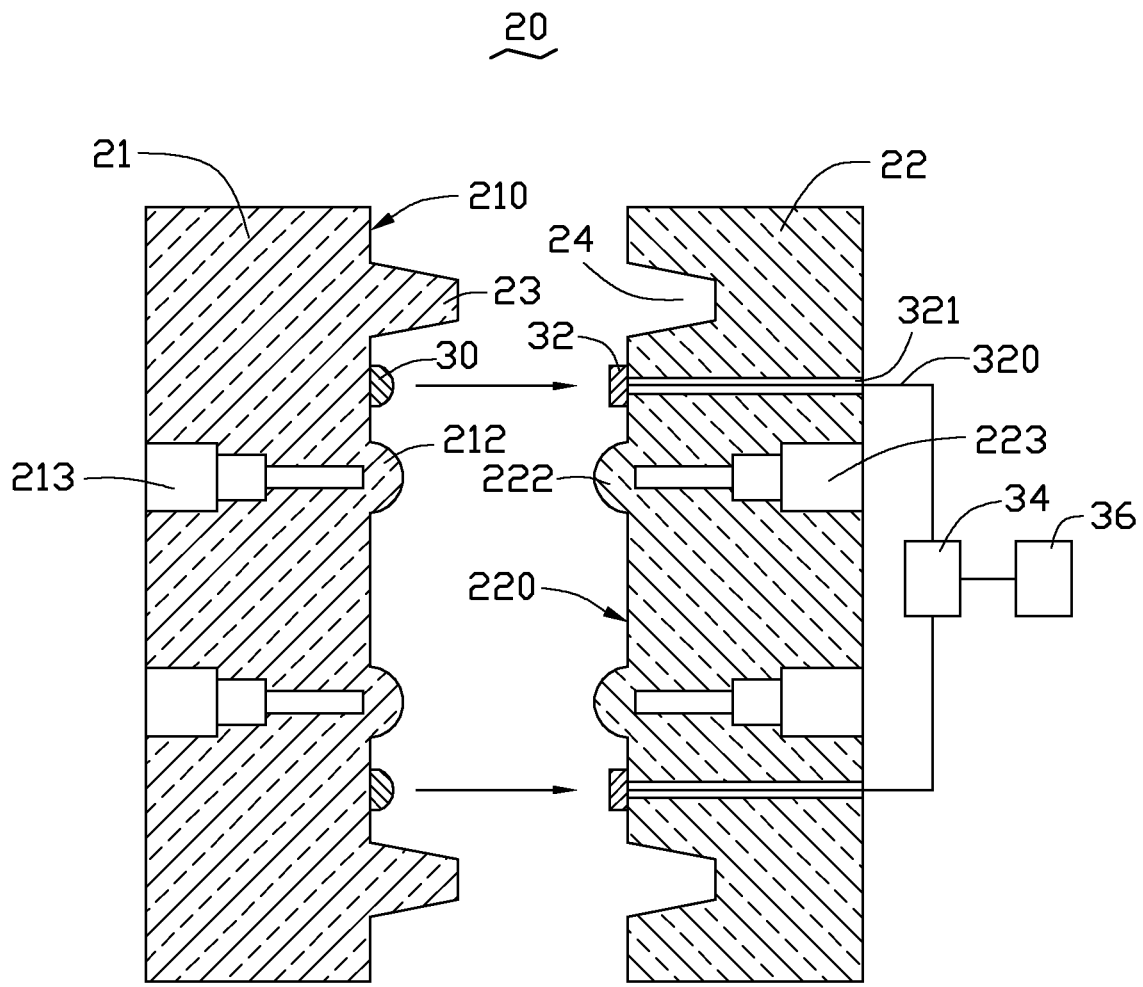
FIG. 1 is a schematic view of an optical fiber coupling device in accordance with a first embodiment.

FIG. 1 shows an optical fiber coupling device 20 in accordance with a first embodiment. The optical fiber coupling device 20 includes a first optical fiber connector 21 and a second optical fiber connector 22 matching with the first optical fiber connector 21. One of the first optical fiber connector 21 and the second optical fiber connector 22 may be buried in an electronic device, and the other one is used as a plug.

The first optical fiber connector 21 includes a first matching surface 210, one or more first lenses 212 formed on the first matching surface 210, and one or more optical fiber blind holes 213 corresponding to the one or more first lenses 212. The second optical fiber connector 22 includes a second matching surface 220, one or more second lenses 222 formed on the second matching surface 220, and one or more optical fiber blind holes 223 corresponding to the one or more second lenses 222. In the illustrated embodiment, there are two first lenses 212 and two second lenses 222, and the first lenses 212 and the second lenses 222 are integrally formed with the first optical fiber connector 21 and the second optical fiber connector 22. That is, the first optical fiber connector 21 and the second optical fiber connector 22 are made of a transparent material.

The first optical fiber connector 21 further includes one or more light sources 30 positioned at the first matching surface 210. The second optical fiber connector 22 further includes one or more light sensors 32 positioned at the second matching surface 220. The light sensors 32 detect an incident light level. The light sensors 32 can be measuring sensors directly measuring an incident light level. Alternatively, the light sensors 32 can be image sensors such as CMOS sensors through which the incident light level can be reflected by pixels output by the CMOS sensors. In particular, each of the light sensors 32 can have a predetermined light level reference, and the light sensors 32 can be connected to a photoelectric converting device 34 through wires 320 received in holes 321 formed in the second optical fiber connector 22, and the photoelectric converting device 34 is finally connected to a display 36.

The predetermined light level reference may be a light level detected by the light sensor 32 when the first optical fiber connector 21 is aligned with the second optical fiber connector 22, or when the alignment degree of the first optical fiber connector 21 and the second optical fiber connector 22 is acceptable. The detected incident light level can be compared with the predetermined light level reference, thereby indicating whether the first optical fiber connector 21 is aligned with the second optical fiber connector 22, or whether the alignment of the first optical fiber connector 21 and the second optical fiber connector 22 is acceptable.

In the present embodiment, the light sensors 32 are located in positions where the light emitted by light sources 30 can be detected by the light sensors 32. The predetermined light level reference may be 80 lumina, when the detected incident light level is 70 lumina, that means the alignment of the first optical fiber connector 21 and the second optical fiber connector 22 is not acceptable, and one of the first optical fiber connector 21 and second optical fiber connector 22 has to be shifted to align with the other one. When the detected incident light level is 85 lumina, that means the first optical fiber connector 21 and the second optical fiber connector 22 are in a high degree alignment. In such cases, light transmission loss between the first optical fiber connector 21 and the second optical fiber connector 22 is can be reduced.

In an alternative embodiment, the light sensors 32 may be located in positions where the light emitted by light sources 30 cannot be detected by the light sensors 32, then the predetermined light level reference may be 5 lumina or even 0 lumina. If the detected incident light level is higher than 5 lumina, that means the first optical fiber connector 21 and the second optical fiber connector 22 are in a lower degree alignment, or even the first optical fiber connector 21 is not in alignment with the second optical fiber connector 22. In contrast, If the detected incident light level is lower than 5 lumina or even 0 lumina, that means the first optical fiber connector 21 and the second optical fiber connector 22 are in a high degree alignment.

Through the photoelectric converting device 34, the detected incident light level, or the compare result between the detected and the predetermined light level can be displayed on the display 36. According to a high degree alignment between the first optical fiber connector 21 and the second optical fiber connector 22, structures on the first matching surface 210 and the second matching surface 220, such as protrusions 23 on the first matching surface 210 and concave portions 24 on the second matching surface 220, the first lenses 212 on the first matching surface 210 and the second lenses 222 on the second matching surface 220 can be formed at the right positions where the protrusions 23 are aligned with the hole portions 24, and the first lenses 212 are aligned with the second lenses 222. In addition, in product applications, the first optical fiber connector 21 and the second optical fiber connector 22 can be in a high degree alignment owing to the light sources 30 and the light sensors 32.

Figure 2:
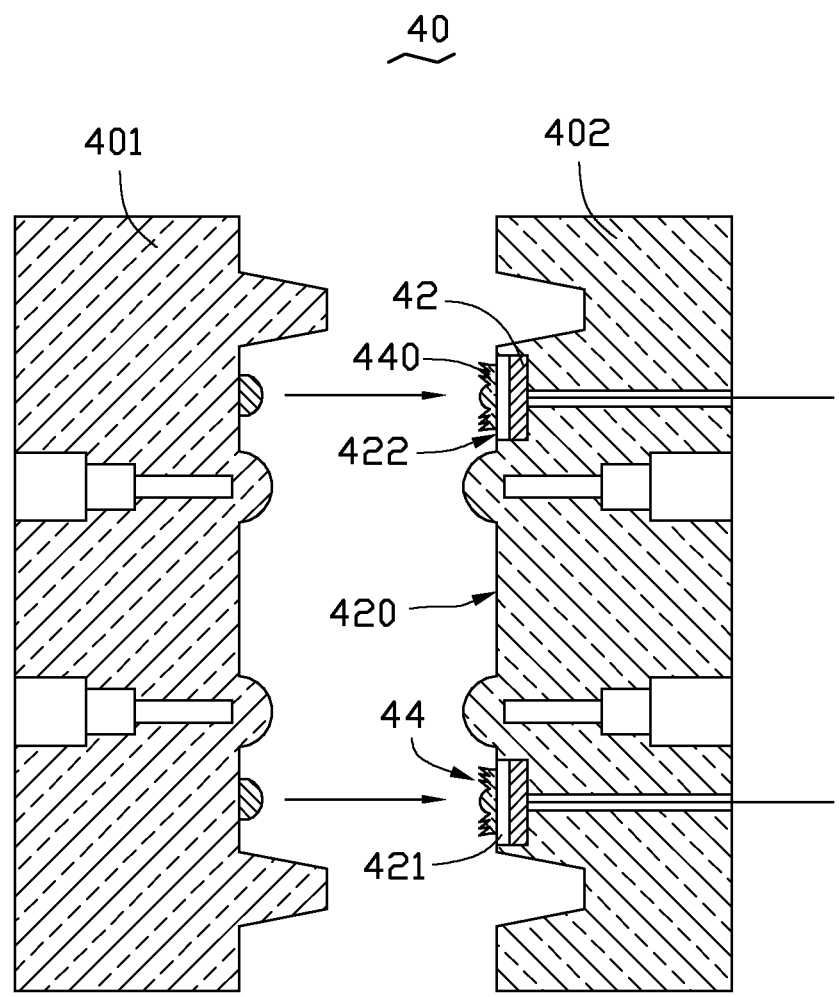
FIG. 2 is a schematic view of an optical fiber coupling device in accordance with a second embodiment.

FIG. 2 shows an optical fiber coupling device 40 in accordance with a second embodiment. The optical fiber coupling device 40 includes a first optical fiber connector 401 and a second optical fiber connector 402 matching with the first optical fiber connector 401. In the second optical fiber connector 402, two troughs 421 are formed in the second matching surface 420, and two light sensors 42 are mounted in the respective troughs 421. Furthermore, two light concentrating units 44 are arranged at the opening of the respective troughs 421. In the present embodiment, the light concentrating unit 44 includes only a Fresnel lens 440, and the Fresnel lens 440 is positioned on a light-transmitting plate 422 mounted at the opening of the respective troughs 421.

By the light concentrating unit 44, light can be concentrated at a small area of the light sensors 42, such that the light sensors 42 are more sensitive.

Figure 3:
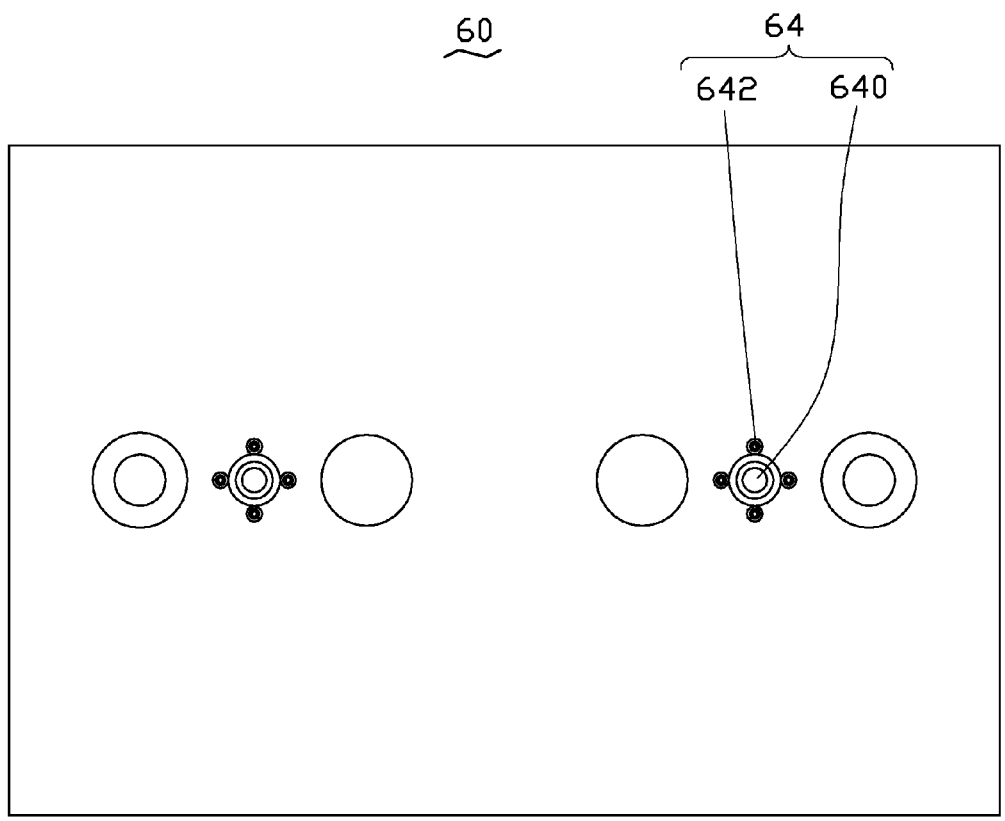
FIG. 3 is a schematic view of an optical fiber coupling device in accordance with a third embodiment.
Figure 4:
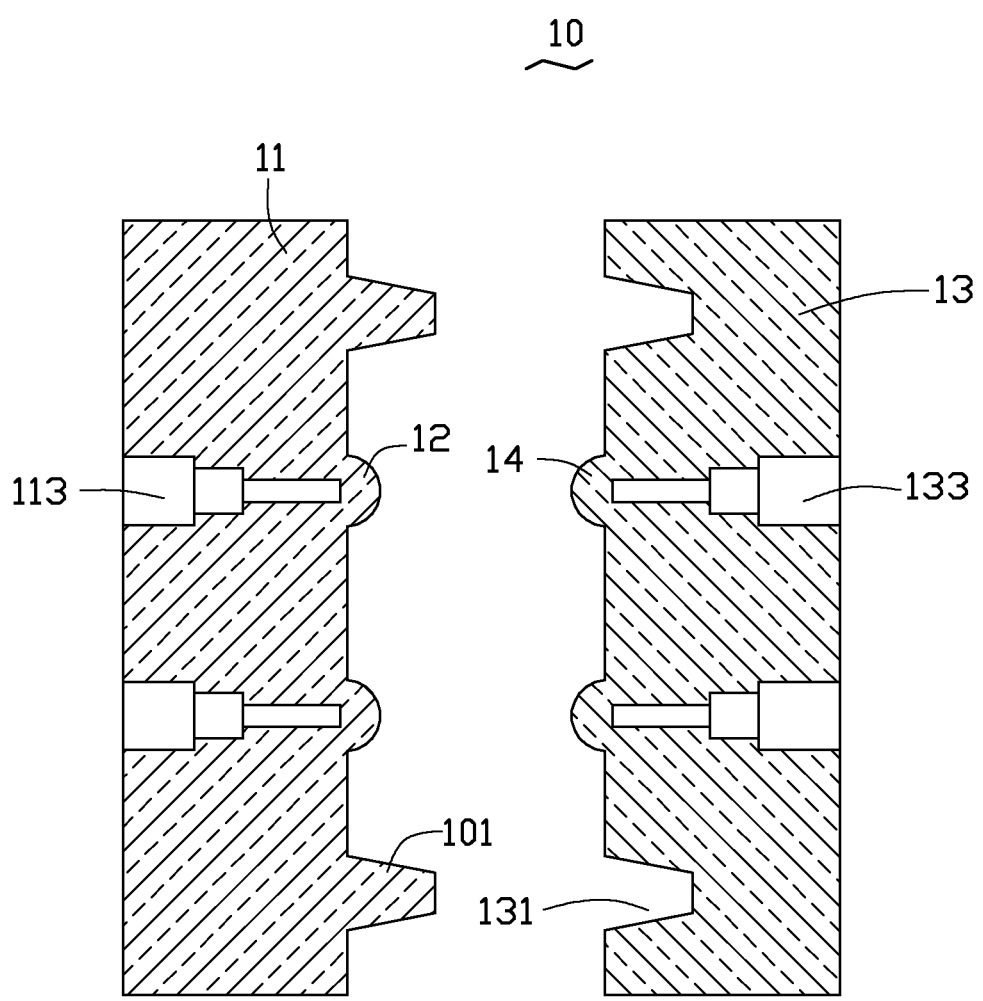
FIG. 4 is a schematic view of a conventional optical fiber coupling device.

FIG. 3 shows an optical fiber coupling device 60 in accordance with a third embodiment. The optical fiber coupling device 60 is essentially similar to the optical fiber coupling device 40, however, the optical fiber coupling device 60 includes light concentrating units 64 each including a main lens 640 and a number of sub-lenses 642. The main lens 640 is arranged in the center, and the sub-lenses 642 are evenly arranged in a circle around the main lens 640. The light sensors (not shown) are arranged after the light concentrating units 64.

In the present embodiment, each of the light concentrating units 64 includes four sub-lenses 642. In a high degree alignment of the first optical fiber connector and the second optical fiber connector, a position of the light sensor corresponding to the main lens 640 may detect most light signals, and positions of the light sensor corresponding to the sub-lenses 642 are uniform in light signal output. If a position of the light sensor corresponding to one of the sub-lenses 642 detects more light signals, then it indicates that the first optical fiber connector or the second optical fiber connector is deviated from the right position.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. An optical fiber coupling device, comprising:
a first optical fiber connector comprising a first lens portion and a light source; and
a second optical fiber connector mechanically and optically coupled with the first optical fiber connector, the second optical fiber connector comprising a second lens portion and a light sensor, the light sensor receiving light from the light source and detecting an light intensity level of the received light, thereby determining alignment accuracy between the first and second lens portions based upon the detected light intensity level, wherein the second optical fiber connector further comprises a photoelectric converting device and a display connected to the photoelectric converting device, the second optical fiber connector defines holes, the photoelectric converting device is electrically connected to the light sensor through wires received in the holes.

2. The optical fiber coupling device of claim 1, wherein when the second optical fiber connector is aligned with the first optical fiber connector, the light sensor is aligned with the light source.

3. The optical fiber coupling device of claim 1, wherein when the second optical fiber connector is aligned position with the first optical fiber connector, the light sensor is misaligned with the light source.

4. The optical fiber coupling device of claim 1, wherein the second optical fiber connector further comprises a light concentrating unit arranged on the light sensor.

5. The optical fiber coupling device of claim 4, wherein the second optical fiber connector further comprises a trough for receiving the light sensor and the light concentrating unit.

6. The optical fiber coupling device of claim 5, wherein the light concentrating unit is a Fresnel lens.

7. The optical fiber coupling device of claim 5, wherein the light concentrating unit comprises a main lens aligned with the light sensor, and a plurality of sub-lenses arranged in a circle around the main lens.

8. The optical fiber coupling device of claim 1, wherein each of the light sensors has a predetermined light level reference, the predetermined light level reference is a light level detected by the light sensors when the first optical fiber connector is aligned with the second optical fiber connector, or when the alignment degree of the first optical fiber connector and the second optical fiber connector is acceptable, the photoelectric converting device, the detected incident light level, or the compare result between the detected and the predetermined light level are displayed on the display.

9. An optical fiber coupling device, comprising:
a first optical fiber connector comprising a first optical fiber hole for receiving a first optical fiber, a first converging lens for alignment with the first optical fiber, and a light source; and
a second optical fiber connector mechanically and optically coupled with the first optical fiber connector, the second optical fiber connector comprising a second optical fiber hole for receiving a second optical fiber, a second converging lens for alignment with the second optical fiber, and a light sensor, the light sensor receiving light from the light source and detecting an light intensity level of the received light, and determining alignment accuracy between the first and second converging lenses by comparing the detected light intensity level with a predetermined light intensity level, wherein the second optical fiber connector further comprises a photoelectric converting device and a display connected to the photoelectric converting device, the second optical fiber connector defines holes, the photoelectric converting device is electrically connected to the light sensor through wires received in the holes.

10. The optical fiber coupling device of claim 9, wherein when the second optical fiber connector is aligned with the first optical fiber connector, the light sensor is aligned with the light source.

11. The optical fiber coupling device of claim 9, wherein when the second optical fiber connector is aligned with the first optical fiber connector, the light sensor is misaligned with the light source.

12. The optical fiber coupling device of claim 9, wherein the second optical fiber connector further comprises a light concentrating unit arranged on the light sensor.

13. The optical fiber coupling device of claim 12, wherein the second optical fiber connector further comprises a trough, and the light sensor and the light concentrating unit are received in the trough.

14. The optical fiber coupling device of claim 13, wherein the light concentrating unit is a Fresnel lens.

15. The optical fiber coupling device of claim 13, wherein the light concentrating unit comprises a main lens aligned with the light sensor, and a plurality of sub-lenses arranged in a circle around the main lens.

16. The optical fiber coupling device of claim 9, wherein the light source is arranged adjacent to the first lens, and the light sensor is arranged adjacent to the second lens.

17. The optical fiber coupling device of claim 9, wherein the first optical fiber connector further comprises a protrusion, and the second optical fiber connector further comprises a hole portion for receiving the protrusion.

18. The optical fiber coupling device of claim 9, wherein each of the light sensors has a predetermined light level reference, the predetermined light level reference is a light level detected by the light sensors when the first optical fiber connector is aligned with the second optical fiber connector, or when the alignment degree of the first optical fiber connector and the second optical fiber connector is acceptable, the photoelectric converting device, the detected incident light level, or the compare result between the detected and the predetermined light level are displayed on the display.

\* \* \* \* \*